United States Patent
Carbonini et al.

(10) Patent No.: US 9,032,865 B2
(45) Date of Patent: May 19, 2015

(54) DEVICE FOR REGULATING THE LEVEL OF A LIQUID IN A BOILER OF A COFFEE MACHINE

(75) Inventors: Carlo Carbonini, Villastanza di Parabiago (IT); Giancarlo Porzio, Villastanza di Parabiago (IT)

(73) Assignee: RANCILIO GROUP SPA, Milan (IT)

(*) Notice: Subject to any disclaimer, the term of this patent is extended or adjusted under 35 U.S.C. 154(b) by 954 days.

(21) Appl. No.: 12/446,147

(22) PCT Filed: Oct. 16, 2007

(86) PCT No.: PCT/IB2007/054207
§ 371 (c)(1),
(2), (4) Date: Apr. 17, 2009

(87) PCT Pub. No.: WO2008/047306
PCT Pub. Date: Apr. 24, 2008

(65) Prior Publication Data
US 2010/0326282 A1    Dec. 30, 2010

(30) Foreign Application Priority Data

Oct. 20, 2006  (EP) ................................. 06425726

(51) Int. Cl.
*A47J 31/44*    (2006.01)
*A47J 31/40*    (2006.01)
(Continued)

(52) U.S. Cl.
CPC . *A47J 31/56* (2013.01); *A47J 31/52* (2013.01); *A47J 31/02* (2013.01);
(Continued)

(58) Field of Classification Search
CPC ....... A47J 31/52; A47J 31/047; A47J 31/056; A47J 31/02; A47J 31/005; G08B 13/26; G01F 23/265; G01F 23/243; G01F 23/268; G01F 23/266; G01N 15/0656; G01N 27/225; G01N 27/221; G01N 27/223; G01N 27/226; H01G 4/224; H01G 4/30; G01B 7/14; G01B 7/087; G01R 27/2605; G01C 19/5719; G01K 3/005; H03K 17/955
USPC ................... 99/280, 281, 282, 283, 279, 285; 340/563, 618, 631, 620; 361/284, 286, 361/301, 303, 301.1; 324/662–690; 73/304 C
See application file for complete search history.

(56) References Cited

U.S. PATENT DOCUMENTS 4,875,497 A * 10/1989 Worthington ...................... 137/2
5,187,979 A *  2/1993 Edmark, III ................. 73/304 C
(Continued)

FOREIGN PATENT DOCUMENTS

GB        441 576 A     1/1936
GB        441576    *    1/1936
(Continued)

*Primary Examiner* — Dana Ross
*Assistant Examiner* — Hemant Mathew
(74) *Attorney, Agent, or Firm* — Sughrue Mion, PLLC

(57) ABSTRACT

The present invention relates to a device to regulate the level of a liquid inside a boiler of a coffee machine, having a transparent duct connected to the boiler and designed to visibly display the level of the liquid inside the boiler, a capacitive sensor that can be positioned outside the transparent duct in determined positions and designed to generate electric signals representing the presence or absence of liquid in correspondence to the position of the sensor along the transparent duct. The sensor of the device has first measuring elements and second measuring elements, both of capacitive type; the second measuring elements are positioned at a predetermined distance from the first measuring elements, and a measuring device designed to measure the impedance between the first and second measuring elements and to generate signals indicating the presence or absence of liquid in correspondence to the position of the sensor. The invention also relates to the machine that includes this device.

13 Claims, 4 Drawing Sheets

(51) Int. Cl.
*A47J 31/06* (2006.01)
*A47J 31/56* (2006.01)
*G01F 23/26* (2006.01)
*A47J 31/52* (2006.01)
*A47J 31/02* (2006.01)
*A47J 31/00* (2006.01)

(52) U.S. Cl.
CPC ............. *A47J 31/005* (2013.01); *A47J 31/4457* (2013.01); *G01F 23/265* (2013.01); *G01F 23/266* (2013.01)

(56) References Cited

U.S. PATENT DOCUMENTS 5,418,466 A * 5/1995 Watson et al. ................. 324/668
6,666,086 B2 * 12/2003 Colman et al. .............. 73/304 C
6,766,728 B2 * 7/2004 Fogagnolo et al. ............. 99/280

FOREIGN PATENT DOCUMENTS

WO 01/60221 A1 * 8/2001 ............... A47J 31/56
WO 03/050480 * 6/2003 ................ G01D 3/00
WO 03/050480 A1 6/2003

* cited by examiner

DEVICE FOR REGULATING THE LEVEL OF A LIQUID IN A BOILER OF A COFFEE MACHINE

TECHNICAL FIELD

This invention relates, in general, to a device that regulates the level of a liquid, for example water, inside a boiler of a coffee machine. In particular, the present invention relates to a capacitive sensor to detect and regulate the water level inside a boiler of an espresso coffee machine, said device comprising a capacitive sensor and means to regulate the quantity of the water inside the boiler to maintain constant the desired water level.

BACKGROUND OF THE INVENTION

As known, coffee espresso machines comprise a boiler to hold and heat the water, a device for water pressurization, one or more devices to supply the coffee and other internal and external components. All these components are contained, preferably, inside an external casing.

The boiler is usually connected to a cold water intake pipe, used to reset, preferably in an automatic way, the optimum level of water during operation. On the water intake there is an electrically activated valve controlled by a dedicated monitoring device which provides the monitoring of the water level inside the boiler and the activation of the electrically activated valve at the detection of the minimum level until the desired level is restored.

The Applicant's publication number WO0160221, teaches a capacitive device to regulate the level of a liquid inside a boiler of a coffee espresso machine.

The known device particularly comprises a capacitive sensor in which a small metal spring acts as the first plate of a capacitor, a tube connecting the boiler acts as the dielectric of the capacitor, and the water (being electrically conductive) acts as the second plate of the capacitor.

According to the known art, the second plate is grounded through the metal of the boiler. A control circuit is connected to the first plate and to the mass of the boiler and it is designed to measure the capacitive variations between the small spring, which can be positioned in pre-established positions along the transparent tube, and the mass of the boiler, at the variation of the level of water inside the transparent tube. As known, the presence of air in correspondence of the small spring is detected as a lower capacitance with respect to the condition when the water is present in correspondence of the small spring.

A problem of the known art is that the equivalent circuit, made of the small spring (capacity sensor), the transparent tube, the air and/or water, the structure and mass of the boiler, present a total impedance, of which the variations caused by the presence of air or water in correspondence of the small spring can be irrelevant compared to the impedance caused by the column of water inside the transparent tube, to the position of the small spring along the transparent tube, and to the structure of the boiler.

In fact, the impedance variations of the water, in relation to its characteristics, such as temperature, mineral salt content, etc., and the characteristics of the boiler, after oxidation, etc., are such as to become relevant in respect to the capacitive variations whose values need to be measured to determine precisely the level of water inside the transparent pipe.

Furthermore, the Applicant has noticed that the performance of the known device is greatly affected by the uncertainty of the capacitive impedance caused by the characteristics of the water, the boiler and the position of the capacitive sensor. Particularly, the Applicant noticed that, above all, the variations of the capacitive impedance of the water, and, secondarily, those of the boiler, can be compared to the impedance variations to be measured to determine the water level in the transparent pipe and, therefore, inside the boiler.

DISCLOSURE OF THE INVENTION

The objective of the present invention is a solution of the prior art problems mentioned above.

This objective is achieved by the device for detecting the level of a liquid in a boiler of a coffee machine, as claimed, and the machine that contains the device.

The claims are an integrated part of the technical teaching here described regarding the invention.

According to one of the preferred embodiments of the present invention, the device comprises a capacitive sensor that can be positioned along the probe in predetermined positions and has the first and second measuring elements positioned to a predetermined distance, and has an electronic circuit configured to measure the capacitive impedance between the first and second measuring elements at the variation of the liquid level in correspondence to the position of the sensor.

According to another embodiment of the present invention, the device comprises a regulating element connected to the measuring electronic circuit, and it is configured to regulate the liquid flow into the boiler.

According to another embodiment of the present invention, the device comprises a display element connected to the measuring electronic circuit, and it is configured to detect the presence or the absence of liquids in correspondence to the position of the sensor.

BRIEF DESCRIPTION OF THE DRAWINGS

This and other features of the present invention will be clarified by the following description of the preferred embodiment, as an example only and not as a limitation, made using the attached drawings on which components labeled by the same or similar numeric reference indicate components with the same or similar functionality and construction, in which.

DETAILED DESCRIPTION OF THE PREFERRED EMBODIMENT OF THE INVENTION

Figure 1:
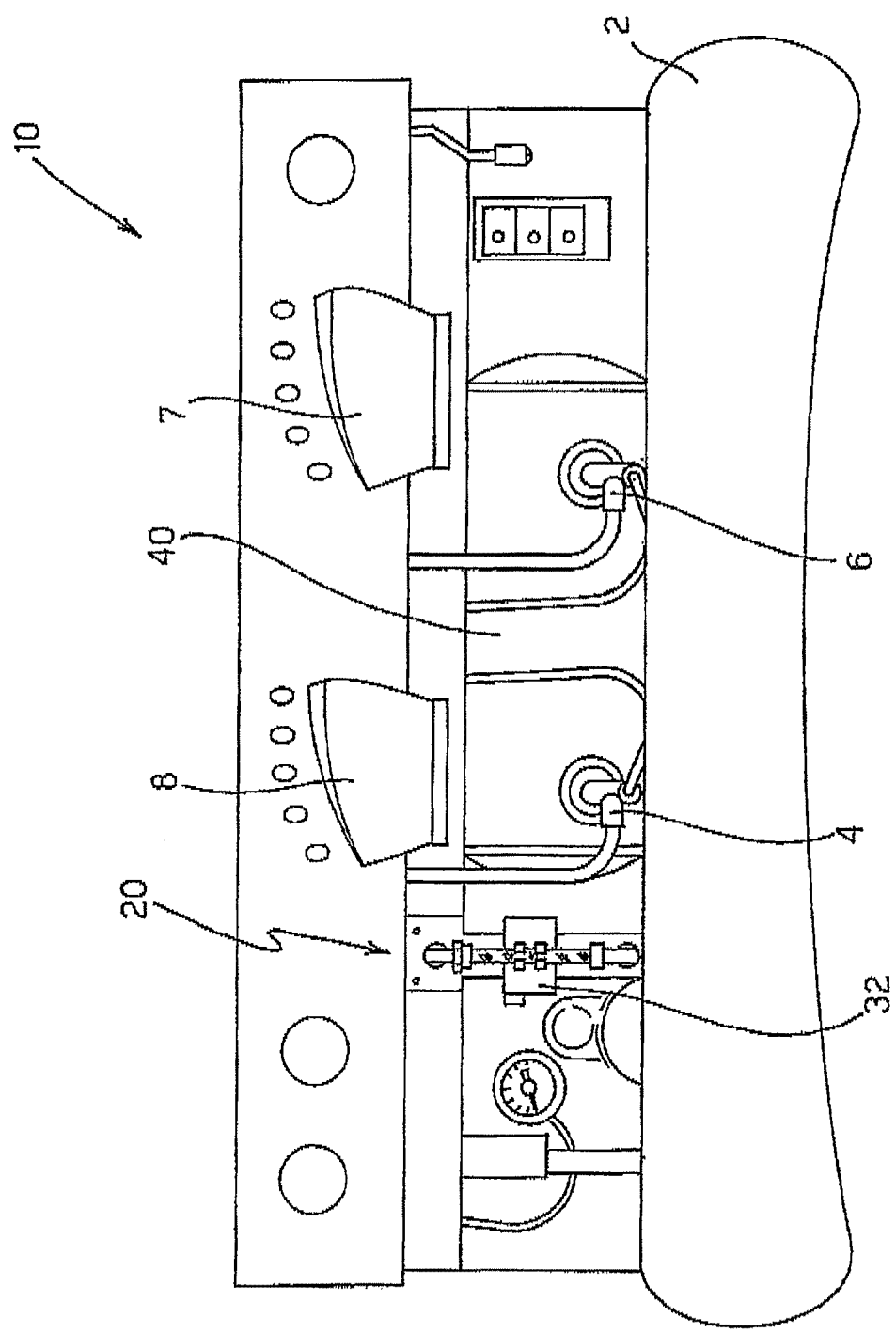
FIG. 1 represents a schematic view of an espresso coffee machine comprising the device in accordance with the present invention.

Referring to FIG. 1, a coffee espresso machine 10 comprises an encasing structure 2 which contains all functional components of the machine. Particularly, some of these functional components are partially visible in the figure, for example, a boiler 40 including two exit ducts 4, 6 connected to two coffee delivery groups 7, 8.

The machine 10, according to the preferred embodiment, comprises a device 12 (FIG. 1, FIG. 2) to regulate the level of a liquid inside the boiler. Of such a device it is visible, via a small cut out window on the front panel, for example at the left side of the boiler 40, a level probe 20 connected to the boiler 40, as further described in detail.

Figure 2:
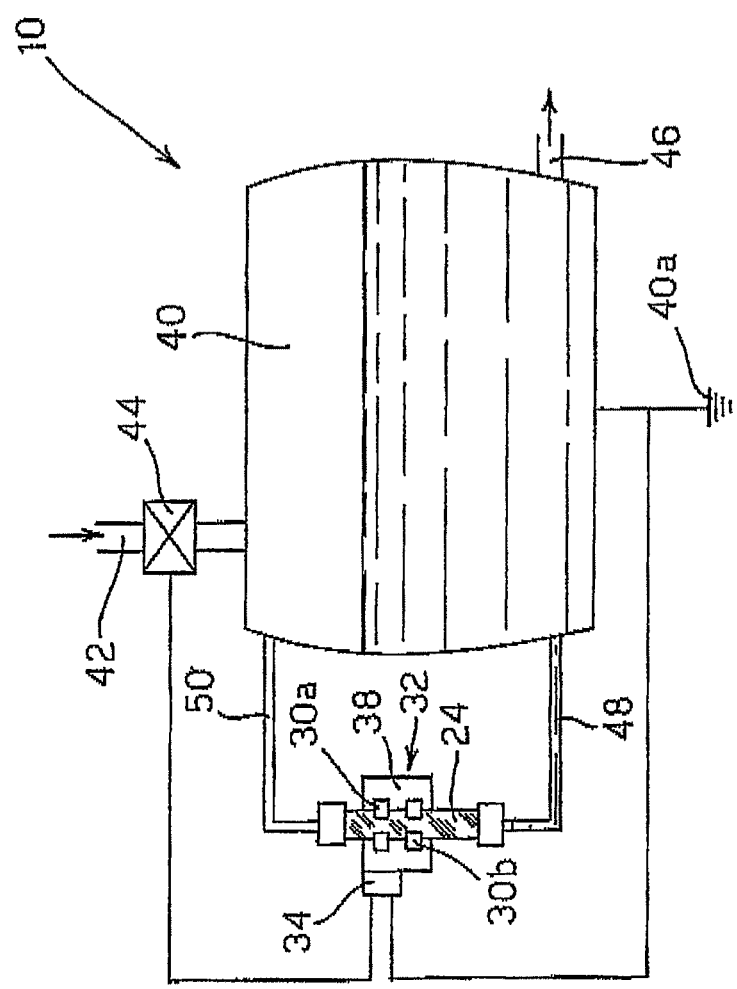
FIG. 2 represents a schematic view of an espresso coffee machine boiler comprising the device in accordance with the present invention.
Figure 3:
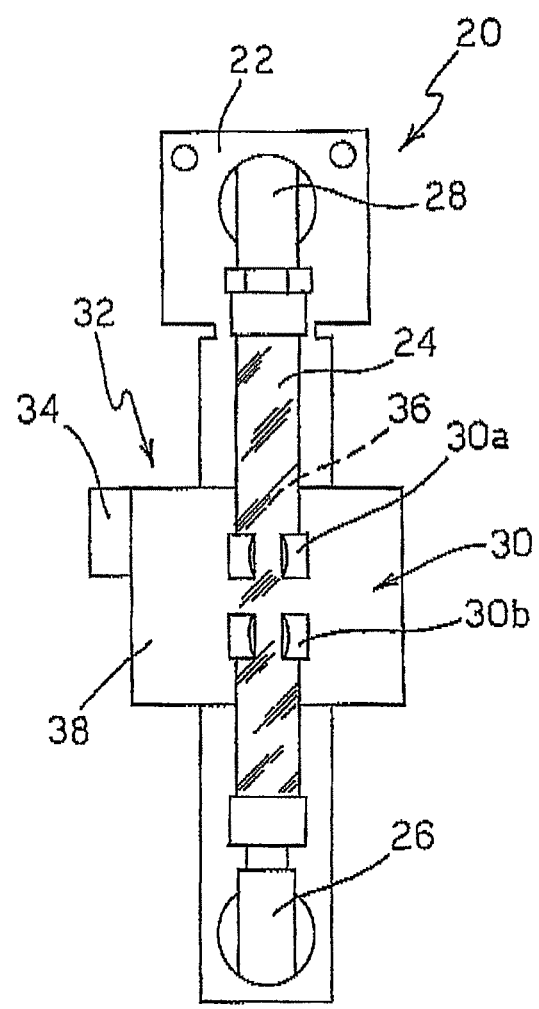
FIG. 3 represents the measuring device in accordance with the present invention.

As illustrated in FIG. 2 and FIG. 3, the device 12, which regulates the level of a liquid inside the boiler 40 of an espresso coffee machine, comprises, in the preferred embodiment, the level probe 20, an electronic control circuit 32 and an electrically activated valve 44, designed to regulate the flow of the liquid (for example water), inside the boiler 40.

The level probe 20 comprises, preferably, a small duct 24 made of dielectric material such as glass or plastic material, such as Teflon®. Using a transparent material, and positioning the level probe on a location of the machine 10 visible from the outside, it is possible to visually detect the current level of the liquid, even when the machine is turned off or the automatic regulation system is not operational. The level probe, in other embodiments, can detect the level of the liquid inside the boiler even in a non visual way.

On the outside of the small duct 24 is attached a capacitive sensor 30, comprising a first and a second thin metal plates, 30a and 30b respectively, bent at a "U" shape and partially wrapping up around the small duct 24 and moving smoothly with attrition along the small duct 24.

The small metal plates 30a and 30b are directly soldered to a small plate 38 at a predetermined distance from one to another, for example, on a printed circuit board which has mounted components of the control circuit 32, as it will be described further in details with reference to FIG. 4.

On the printed circuit board 38, preferably behind the small duct 24, to be visible from the outside of the machine, there is a luminous display device 36, for example a Light-Emitting Diode (LED), preferably bi-color. This luminous display device (LED) 36 is designed to signal either the presence of water inside the boiler and the correct power supply to the printed circuit board 38, by displaying a green color, or the lack of water inside the boiler and the activation of the electrically activated valve, by displaying a red color.

The electric connector 34 supplies the electric power to the control circuit 32 and controls the electrically activated valve 44, directly or by way of an electric/electronic power interface, for example a relay.

The boiler 40 comprises an inflow duct 42 carrying cold water, interrupted by the electrically activated valve 44, and an outflow duct 46 carrying the hot water, and a ground connection 40a.

The level probe 20 is connected to the boiler 40 by way of two ducts 48 and 50, particularly, the lower part 26 of the level probe 20 is connected to the bottom part of the boiler 40, while its upper part 28 is connected to the top part of the boiler 40. This allows the level of the liquid (water) inside the small duct 24 of the level probe 20 to be at the same level as the liquid inside the boiler 40.

Obviously, to function correctly, it is necessary to position the sensor 30 to a height corresponding to the desired level of water inside the boiler.

According to the preferred embodiment, the control circuit 32 is positioned in the immediate vicinity of the probe 20 and activates, directly or by way of a relay, the electrically activated valve 44 which regulates the flow of water into the boiler.

The control circuit 32, as it will be described further in more detail, is designed to measure capacitive impedance values or capacity between the first thin metal plate 30a (also referred to as the first measuring element) and the second thin metal plate 30b (also referred to as the second measuring element). These measured capacitive values correspond to the variation of the water level inside the small duct 24 in the area where it is attached, for example, the first thin metal plate 30a. The control circuit 32 compares each capacitance value measured to one or more calibration values as determined during the calibration of the probe 20, and generates, by consequence, a signal that controls the display of the LED 36 and the activation of the electrically activated valve 44.

Figure 4:
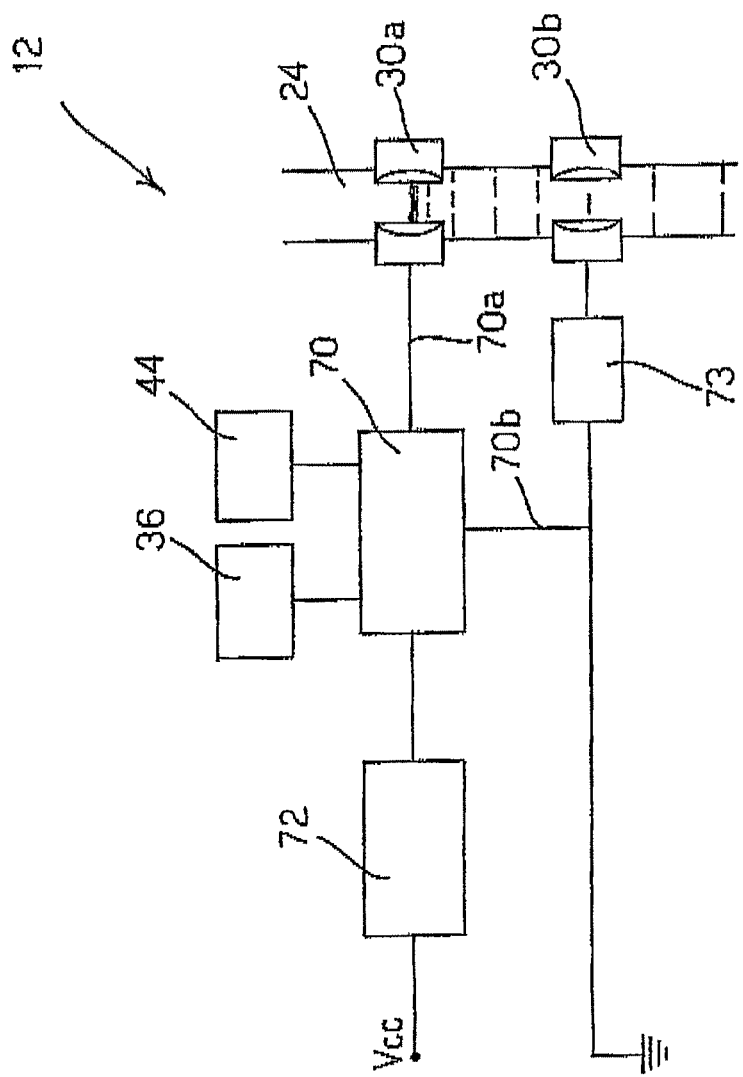
FIG. 4 represents an electrical block diagram of the control circuit for the device of FIG. 2.

FIG. 4 illustrates a simplified electronic block diagram of the control circuit board 32 that, in the preferred embodiment, comprises the first and the second measuring elements, respectively 30a and 30b, the LED 36, a measuring logical circuit 70 and a stabilizing element 72, connected to the measuring logical circuit 70 to control and stabilize the electric power supply.

The measuring logical circuit 70 comprises, preferably, a microcontroller with an internal memory, for example, the microcontroller model PIC12F629P from the supplier MICROCHIP, and it is connected by way of the first connection 70a to the first measuring element 30a and, by way of the protective resistor 73 and by a second connection 70b, to the second measuring element 30b to form a circuit measuring the capacitive impedance between the first measuring element 30a and the second measuring element 30b. The logical circuit is also connected to the LED 36 and, directly or indirectly, for example, through a controlling device, to the electrically activated valve 44.

According to the preferred embodiment, the logical circuit 70 is designed to control the lighting of the LED 36 and the activation of the electrically activated valve 44 in function of the capacitive impedance values measured between the first and the second measuring elements 30a and 30b. Particularly, according to the preferred embodiment, the logical circuit 70 is configured to generate a signal to a predetermined frequency which, while passing through the RC circuit (i.e. measuring elements 30a and 30b, the small duct 24, the liquid, connections 70a and 70b, and protective resistor 73), modifies its own frequency to a greater or smaller frequency depending on the capacitance of the RC circuit. The modified signal is measured at predetermined time intervals, for example using a counter internal to the logical circuit 70, to detect the frequency as being modified.

As known, in case of elevated capacitance (due to the presence of water between the first measuring elements 30a) of the circuit RC, the value of the frequency will be lower than the value obtained in case of low capacitance of the circuit RC (due to the absence of water between the first measuring elements 30a) so then:

In case the measured frequency is greater than a pre-established threshold, for example, a threshold value stored in the internal memory of the logical circuit 70, the logical circuit 70 will command the lighting of the LED 36 to red and the activation of the electrically activated valve 44 to supply the liquid to the boiler 40;

In case the measured frequency is lower than the pre-established threshold, the circuit logic 70 will command the lighting of the LED to green to signal the correct power supply to the control circuit 32 and the de-activation of the electrically activated valve 44.

Obviously, according to other embodiments of the invention, the measurement of the capacitive impedance in the presence or in the absence of water in the small duct 24 can be performed by other known measurement methods without deviating from what has been described and claimed.

Following is the description of the functioning of the device. During a first phase, a calibration of the device is performed, for example in the factory, using a hydraulic circuit equivalent to the type of circuit present on the machine to be built.

The calibration provides, in particular, that in the presence of pre-determined frequency signals generated by the logic circuit 70, the frequency generated in the measuring circuit, will be measured, alternatively, in presence of water and in the absence of water. Such a measurement will be memorized in the internal memory of the logic circuit 70 as a value, for example an intermediate value, indicative of a threshold value or of a value related to water detection.

According to a second embodiment of the invention, the first phase can provide the measurement in the hydraulic equivalent circuit of a number of frequency values correspondent to their respective levels of water in the boiler 40 and that these different values be memorized in the internal memory of the logical circuit 70, indicative in this case, of a scale of filling levels of the boiler around the position of the sensor.

In a second phase, the device is operating by supplying electric power to the control circuit 32 and positioning the capacitive sensor to a pre-established level along the small duct 24.

For example, during operation, the logical circuit 70, at pre-determined time intervals, will:
transmit the signals at the pre-determined frequency to the probe 30;
detect the frequency in the measurement circuit;
compare the detected frequency to the memorized frequency in the internal memory of the logical circuit 70 and, depending on the detected frequency being greater than or equal to the one memorized, it will:
illuminate the LED 36, respectively to color red or green;
activate the electrically activated valve 44 or de-activate it (maintaining it inactive).

According to the second embodiment, the second phase provides, for example, that the logical circuit 70 be configured to compare the detected frequency to those memorized in the internal memory of the logical circuit 70 and, depending on the detected frequency is corresponding with or being very close to one of the memorized frequencies, the logical circuit 70 will determine the level of the liquid inside the boiler within the set of filling levels and will activate, the lighting of the LED 36, respectively to red or in green, and will activate or de-activate the electrically activated valve 44 depending on the set of memorized levels.

As described, the device 12 allows to regulate the liquid level inside the boiler of the coffee machine in a simple and effective way.

As a great advantage, the device measures the capacitive impedance of an equivalent RC circuit in which the only variables are the quantities of water present between the first metal small plate 30*a* and the second small metal plate 30*b*.

This preferred embodiment avoids the risk of significant measurement errors related to mineral incrustations inside the boiler, to different electrical conductivity characteristics of the liquid (water), to the position of the capacitive sensor along the probe, etc.

As a significant advantage, the protective resistor 73, added to protect the logical circuit 70 from breakdowns due to possible excess currents, is dimensioned, in the preferred embodiment, using resistor values of at least one order of magnitude lower than those between the second small metal plate 30*b*, the water, the boiler 40, and the boiler's ground connection 40*a* (grounding circuit of the boiler), in order to insure that the measuring circuit will not be affected by the electric characteristics of the boiler's grounding circuit, and, in particularly, by the electric conductivity of the water.

Obvious modifications or variations to the above description are possible when related to the dimensions, shapes, materials, components, circuit elements, connections and contacts, as well as circuitry and construction details as illustrated and to the operating method without deviating from the spirit of the invention which is set forth in the following claims.

The invention claimed is:

1. A device to regulate the level of a conductive liquid inside a boiler of a coffee machine comprising
a level probe connected to the boiler and capable of resetting the level of the liquid inside the boiler, the level probe comprising a tubular element made of dielectric material;
a capacitive sensor that is positioned externally to the level probe in determined positions to modify electric signals that represent the presence or the absence of a liquid inside to said tubular element in correspondence with said determined positions;
wherein said capacitive sensor comprises
a first measuring element of capacitive type, comprised of a first electrically conductive plate partially encircling the tubular element and positioned in a first position along the tubular element of the level probe;
a second measuring element of capacitive type positioned at a predetermined distance from said first measuring element and comprised of a second electrically conductive plate partially encircling the tubular element and positioned at a predetermined distance from said first electrically conductive plate along the tubular element of the level probe;
the device further comprising:
an RC circuit, comprising the capacitive sensor and configured to modify the electric signals while passing through the RC circuit;
a measuring logical circuit, connected to the RC circuit, and configured to generate said electric signals to a predetermined frequency and to measure the electric signals modified by said RC circuit;
wherein said modified electric signals have a lower or greater frequency depending on capacitive impedance values between the first measuring element and the second measuring element, which correspond to a variation of the level of the liquid inside the tubular element.

2. The device according to claim 1, further comprising:
means of regulation connected to said measuring logical circuit and configured to regulate the flow of the liquid to the boiler depending on said modified electric signals.

3. The device according to claim 1, comprising
signalling means connected to said measuring logical circuit and configured to signal at least the presence or the absence of liquid in correspondence to said determined position.

4. The device according to claim 1 characterised in that said measuring logical circuit comprises a programmable logical circuit having memory means and in that said memory means are configured to store at least a reference frequency value representing a threshold value to be compared to measured frequencies of the modified signals depending on the capacitive impedance values.

5. The device according to claim 1 characterised in that said measuring logical circuit comprises a logical programmable circuit which has memory means and in that said memory means are configured to store a reference set of values representing a set of frequency values related to different level of liquid, said values to be compared to measured frequencies of the modified signals depending on the capacitive impedance values.

6. The device according to claim 1 comprising at least one protective resistor connected between said second measuring element and said measuring logical circuit, said protective resistor having a resistance at least one order of magnitude lower than the resistor's value determined between the liquid and the ground.

7. A coffee machine comprising:
a boiler;
a device to regulate the level of a conductive liquid inside a boiler of a coffee machine comprising:
a level probe connected to the boiler and capable of resetting the level of the liquid inside the boiler, the level probe comprising a tubular element made of dielectric material;
a capacitive sensor positioned externally to the level probe in determined positions to modify electric signals that represent the presence or the absence of a liquid inside to the tubular element in correspondence with said determined positions; said capacitive sensor comprises:
a first measuring element of capacitive type, comprised of a first electrically conductive plate partially encircling the tubular element and positioned in a first position along the tubular element of the level probe;
a second measuring element of capacitive type positioned at a predetermined distance from said first measuring element and comprised of a second electrically conductive plate partially encircling the tubular element and positioned at a predetermined distance from said first electrically conductive plate along the tubular element of the level probe;
the coffee machine further comprising:
an RC circuit, comprising the capacitive sensor and configured to modify the electric signals while passing through the RC circuit;
a measuring logical circuit, connected to said RC circuit, and configured to generate the electric signals to a predetermined frequency, and to measure the electric signals modified by said RC circuit;
the modified electric signals having a lower or greater frequency depending on capacitive impedance values between the first measuring element and the second measuring element, which correspond to variation of the level of the liquid inside the tubular element.

8. The coffee machine according to claim 7, further comprising a coffee delivery group.

9. The coffee machine according to claim 7, comprising regulation means connected to said measuring logical circuit elements for regulating the flow of the liquid to the boiler depending on said modified electric signals.

10. The coffee machine according to claim 7, comprising signalling means connected to said measuring logical circuit for signalling at least the presence or the absence of liquid in correspondence to said determined position.

11. The coffee machine according to claim 7, wherein said measuring logical circuit comprises a programmable logical circuit having memory means, said memory means configured to store at least a reference frequency value representing a threshold value to be compared to measured frequencies of the modified signals depending on the capacitive impedance values.

12. The coffee machine according to claim 7, wherein said measuring logical circuit comprises a logical programmable circuit which has memory means and said memory means is configured to store a reference set of frequency values representing a set of values related to different level of liquid, said values to be compared to measured frequencies of the modified signals depending on said capacitive impedance values.

13. The coffee machine according to claim 7, comprising at least one protective resistor connected between said second measuring element and said measuring logical circuit, said protective resistor having a resistance at least one order of magnitude lower than the resistor's value determined between the liquid and the ground.

* * * * *